United States Patent [19]

McCarty

[11] Patent Number: 6,014,383
[45] Date of Patent: Jan. 11, 2000

[54] SYSTEM AND METHOD FOR CONTROLLING MULTIPLE INITIATORS IN A FIBRE CHANNEL ENVIRONMENT

[75] Inventor: James F. McCarty, Spring, Tex.

[73] Assignee: Compaq Computer Corporation, Houston, Tex.

[21] Appl. No.: 08/797,129

[22] Filed: Feb. 10, 1997

[51] Int. Cl.$^7$ .................................................. H04B 10/08
[52] U.S. Cl. .......................... 370/453; 370/404; 370/405; 395/200.52
[58] Field of Search ..................................... 370/906, 457, 370/405, 404, 522, 410, 428, 453, 475; 395/200.52, 200.8

[56] References Cited

U.S. PATENT DOCUMENTS

| | | | |
|---|---|---|---|
| 5,175,822 | 12/1992 | Dixon et al. | 395/275 |
| 5,237,660 | 8/1993 | Weber et al. | 395/250 |
| 5,313,323 | 5/1994 | Patel | 359/115 |
| 5,471,639 | 11/1995 | Harrington | 395/842 |
| 5,535,035 | 7/1996 | DeFoster et al. | 370/906 |
| 5,544,326 | 8/1996 | Pease et al. | 395/250 |
| 5,546,550 | 8/1996 | Carter | 395/309 |
| 5,638,518 | 6/1997 | Malladi | 370/906 |
| 5,768,530 | 6/1998 | Sandorfi | 395/200.52 |
| 5,768,623 | 6/1998 | Judd et al. | 395/200.8 |
| 5,805,924 | 9/1998 | Stoevhase | 395/200.8 |
| 5,812,754 | 9/1998 | Lui et al. | 395/200.8 |

OTHER PUBLICATIONS

"Ultra SCSI White Paper", *Quantum*; Nov. 25, 1996; http://www.quantum.com/products/whitepapers/ultraSCSI.html; pp. 1–7.

"Fibre Channel for the Long Run"; Newsletter; *Interphase ICON–Technical news*; Nov. 25, 1996; http://www.iphase.com/Public/Events/ICON/Fall/Tech_News.html; pp. 1–3.

"Fibre Channel Loop Community" Newsletter; Nov. 26, 1996; http://www.symbios.com/fclc/fc21cen.html; pp. 1–7.

Frymoyer, Edward J.; "Fibre Channel Fusion: Low Latency, High Speed"; *Hewlett–Packard Co.*, Feb. 1995; http://www.data.com/Tutorials/Fibre_Channel_Fusion.html; Nov. 25, 1996; pp. 1–9.

"Why Fibre Channel, why ATM? Competitors or Complementary?"; *Ancot*; Nov. 26, 1996; http://www.anco.com/modiscuss.html; pp. 1–3.

Sutton, Tim and Webb, David; "Fibre Channel: The Digital Highway Made Practical"*Seagate*, Oct. 22, 1994; http://www.maxcom.nl/seagate/wpaper/fibrchan.html; Nov. 25, 1996; pp. 1–7.

Goralski, Walter and Kessler, Gary; "Fibre Channel: Standard, Applications, and Products"; Dec. 1995; http://www.hill.com/personnel/gck/fibre channel.html; Nov. 25, 1996; pp. 1–8.

"Input/Output Buses", Nov. 25, 1996; httP//www.sanders.com/hpc/ArchGuide/Elements/Commune/IO.html; pp. 1–3.

"SCSI Description" Quantum Grand Prix SCSI Manual; Chapter 6–6.1; Nov. 26, 1996; http://www.quantum.com/products/manuals/gp–scsi–manual/chap6.1.html; pp. 1–2.

"SCSI Description" Quantum Grand Prix SCSI Manual; Chapter 6.2–6.2.1; Nov. 26, 1996; http://www.quantum.com/products/manuals/gp–scsi–manual/chap6.2.1.html; one page.

"SCSI Description" Quantum Grand Prix SCSI Manual; Chapter 6.2.2–6.2.3; Nov. 26, 1996; http://www.quantum.com/products/manuals/gp–scsi–manual/chap6.2.3.html#6; one page.

"SCSI Description" Quantum Grand Prix SCSI Manual; Chapter 6.2.4; Nov. 26, 1996; http://www.quantum.com/products/manuals/gp–scsi–manual/chap6.2.4.html; one page.

"Mapping SCSI to Fibre Channel"; *Emulex Fibre Channel Products*; Nov. 25, 1996; http:.//www.emulex.com/fc/scsi–mapping.html; pp. 1–2.

"Interphase Announces PCI Interface for HP's Tachyon Fibre Channel Controller Chip" New Release; *Interphase Corporation*; Nov. 25, 1996; http://www.iphase.com/Public/PressReleases/1996/TSI_PCI.html' pp. 1–2.

*Primary Examiner*—Chi H. Pham
*Assistant Examiner*—Frank Duong
*Attorney, Agent, or Firm*—Jenkens & Gilchrist, P.C.

[57] ABSTRACT

A computer system with a plurality of devices compatible with the Fibre Channel Protocol, wherein at least two of which devices are initiators. The computer system is provided with the capability to control and manage multiple initiators configured in an Arbitrated Loop. This capability is realized by manipulating the contents in outstanding_link_services arrays associated with the initiators.

8 Claims, 5 Drawing Sheets

SYSTEM AND METHOD FOR CONTROLLING MULTIPLE INITIATORS IN A FIBRE CHANNEL ENVIRONMENT

BACKGROUND OF THE INVENTION

1. Technical Field of the Invention

The present invention relates to channel and network communication systems and processes and, in particular, to a system and method for controlling multiple initiators in a Fibre Channel environment.

2. Description of Related Art

There are two kinds of protocols for device communication: channels and networks. Channels, between a master host computer and a slave peripheral device, are designed to transport a large amount of data at very high speeds over relatively small distances with little software overhead once data transmission commences. A channel generally provides a direct or switched point-to-point connection between a master and a slave that is hardware-intensive. Networks, on the other hand, are designed to interface many users, sharing a plurality of hosts and system resources, over medium to large distances and support many transactions. With respect to networks, higher overhead is generally acceptable as long as high connectivity is achieved.

The Fibre Channel Protocol ("FCP") is a new generation protocol that combines the best of these two disparate methods of communication in a single Open-Systems-Interface-like (OSI-like) stack architecture. Essentially, the Fibre Channel ("FC") is a multi-topology, multi-layer stack with lower-layer-protocols ("LLPs") for controlling the physical transport characteristics and upper-layer-protocols ("ULPs") for mapping LLP communication to and from higher-level software structures that are compatible with an Operating System. These ULPs include both channel and network protocols such as Intelligent Peripheral Interface ("IPI"), Small Computer System Interface ("SCSI"), and Internet Protocol ("IP"), among others.

It is well-known that devices that engage in either channel or network communication may be categorized as "initiators" or "targets" or both, depending upon their functionality. Certain specific functions are assigned to either an initiator or a target: (i) an initiator can arbitrate for the communication path and select a target; (ii) a target can request the transfer of command, data, status, or other information to or from the initiator, and (iii) in some instances, a target can arbitrate for the communication path and reselect an initiator to continue a transaction.

For devices that are operable with the Fibre Channel Protocol, only those devices which have the initiator functionality may initiate what is known in the art as a Link Service Request or an Extended Link Service Request. Link Service commands provide Fibre Channel initiators with the ability to perform such tasks as Node Discovery, Abort Requests and Reject Communication frames. The only Link Service command a Fibre Channel target can initiate is a Reject command/frame ("LS_RJT").

Typically, in a single initiator FC environment, the initiator device sends out such Link Service Commands as are needed and expects in response thereto an Acknowledgment ("LS_ACK") frame or a Reject frame (LS_RJT) from a target. Hereinafter, these LS_ACK and LS_RJT frames will be collectively referred to as "response" frames. In a multi-initiator environment, on the other hand, an initiator operates as both a recipient and a sender of Link Service commands. Because of these twin roles, such an initiator operates as both a recipient and a sender of a response frame.

It is known in the art that because of these bi-directional transmissions among the initiators, there is a great potential for severe confusion in a multi-initiator FC environment. In fact, due to such confusion on the part of initiators, initialization procedures responsible for establishing a viable communication link have been known to stall, causing transmission interruptions in multi-initiator environments.

It can be appreciated that although providing multiple initiators in a channel or network communication system would conceptually increase performance levels and achieve a higher degree of connectivity, interruptions such as those described above in a multi-initiator FC environment could also increase the down-time for the communication links to unacceptable levels in high-performance, leading-edge systems.

Although various single initiator FC implementations have been extant for some time, no multi-initiator FC communication system is known that adequately addresses the above-described problems and deficiencies and/or possesses all of the advantages and novel features of the invention described and claimed hereinbelow.

SUMMARY OF THE INVENTION

The present invention overcomes the above-identified problems as well as other shortcomings and deficiencies of existing technologies by providing a method for managing and controlling a Fibre Channel communication environment in a computer system, which environment includes a plurality of FC devices, at least two of which FC devices are initiators, the method for managing and controlling comprising the steps of: transmitting a request frame from each of the initiators to each of the plurality of FC devices after storing a type information element associated with the request frame; and sending a response frame from each of the initiators without storing its type information element, in response to a received request frame.

The present invention further provides a system for managing and controlling a Fibre Channel communication environment in a computer system, which environment includes a plurality of FC devices, including multiple initiators, the system comprising: means for transmitting a request frame from each of the initiators to each of the plurality of FC devices after storing a type information element associated with the request frame; and means for sending a response frame from each of the initiators without storing its type information element, in response to a received request frame.

BRIEF DESCRIPTION OF THE DRAWINGS

A more complete understanding of the present invention may be had by reference to the following Detailed Description when taken in conjunction with the accompanying Drawings wherein.

DETAILED DESCRIPTION OF THE DRAWINGS

Figure 1:
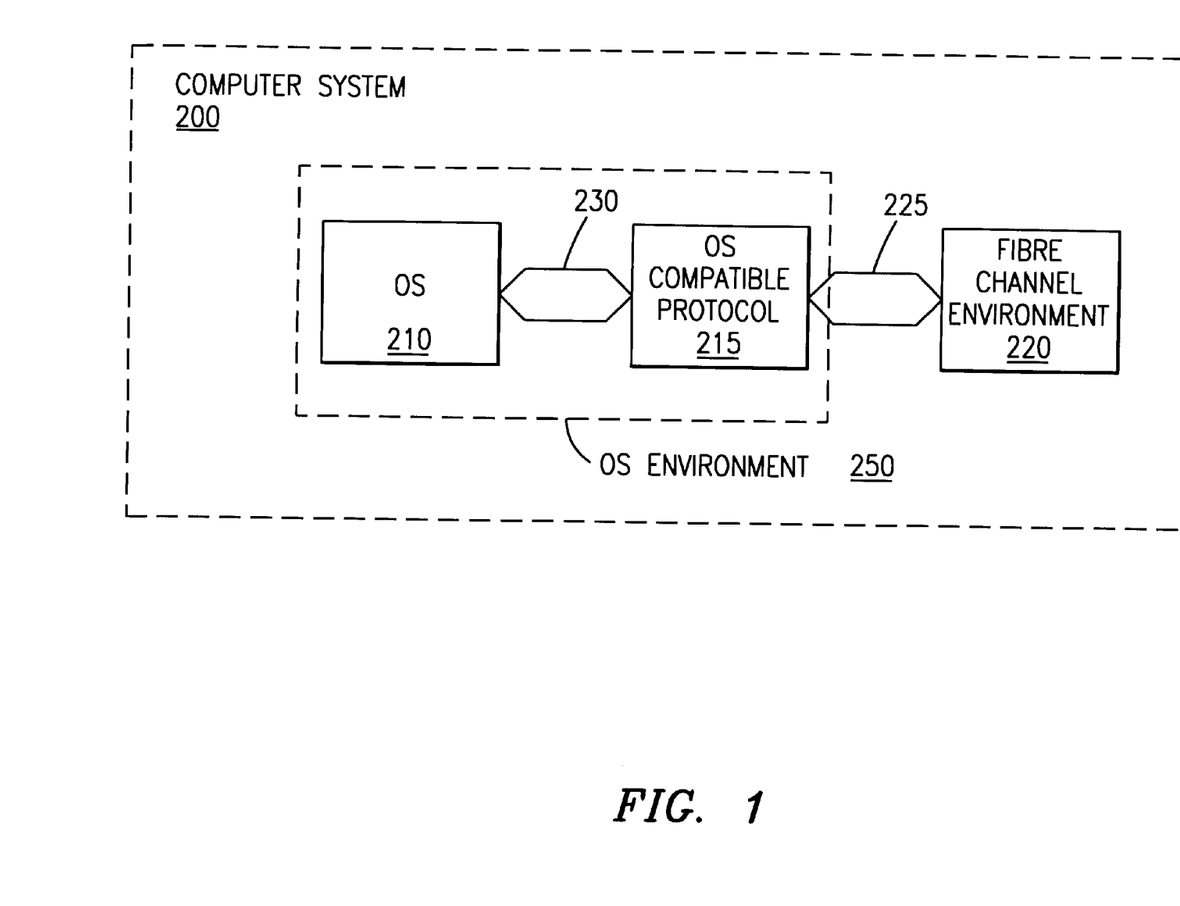
FIG. 1 illustrates a block diagram of an exemplary computer system wherein the teachings of the present invention may be practiced.

Referring now to the drawings wherein like or similar elements are designated with identical reference numerals throughout the several views, and wherein the various elements depicted are not necessarily drawn to scale, and, in particular, to FIG. 1, there is shown a block diagram of an exemplary computer system 200 wherein the teachings of the present invention may be practiced. As can be appreciated by those skilled in the art, the computer system 200 is represented herein in its functional aspects. An Operating System ("OS") 210 is operably provided in the computer system 200 to control the information flow associated therewith. The OS 210 may be a Disk Operating System ("DOS") or a Network Operating System ("NOS") such as, for example, Windows NT® or NetWare®, which may be appropriate depending upon whether the computer system 200 is arranged in a network configuration.

The OS 210, moreover, is operable with at least a conventional channel communication interface such as, for example, the SCSI standard. The exemplary OS 210 may further be provided with such functional structures that would enable interoperability with conventional network communication protocols such as, for example, the Internet Protocol ("IP").

Continuing to refer to FIG. 1, the exemplary OS 210 communicates with an OS-compatible channel or network communication protocol/interface 215 via an upper_level_communication path 230. It should be appreciated that the upper_level_communication path 230 in the functional block representation of the exemplary computer system 200 may encompass such OS-software structures as communication protocol drivers, for example, the SCSI protocol drivers or IP protocol drivers. The exemplary OS 210 and the OS-compatible interface/protocol 215 together constitute what will be henceforth referred to as an OS environment 250 in the computer system 200. Reference numeral 220 refers to a Fibre Channel ("FC") environment which may encompass a plurality of FC devices operable in accordance with the teachings of the present invention in addition to the known Fibre Channel Protocol ("FCP") architecture described below in further detail.

Still continuing to refer to FIG. 1, it can be appreciated that most Operating Systems including, for example, the OS 210, are not provided with the capability of communicating "directly" with the devices disposed in the FC environment 220. Therefore, in order to operably include and harness the benefits of the FC environment 220 in an exemplary computer system 200, a link path 225 is provided between the FC environment 220 and the OS-compatible communication interface 215.

Figure 2:
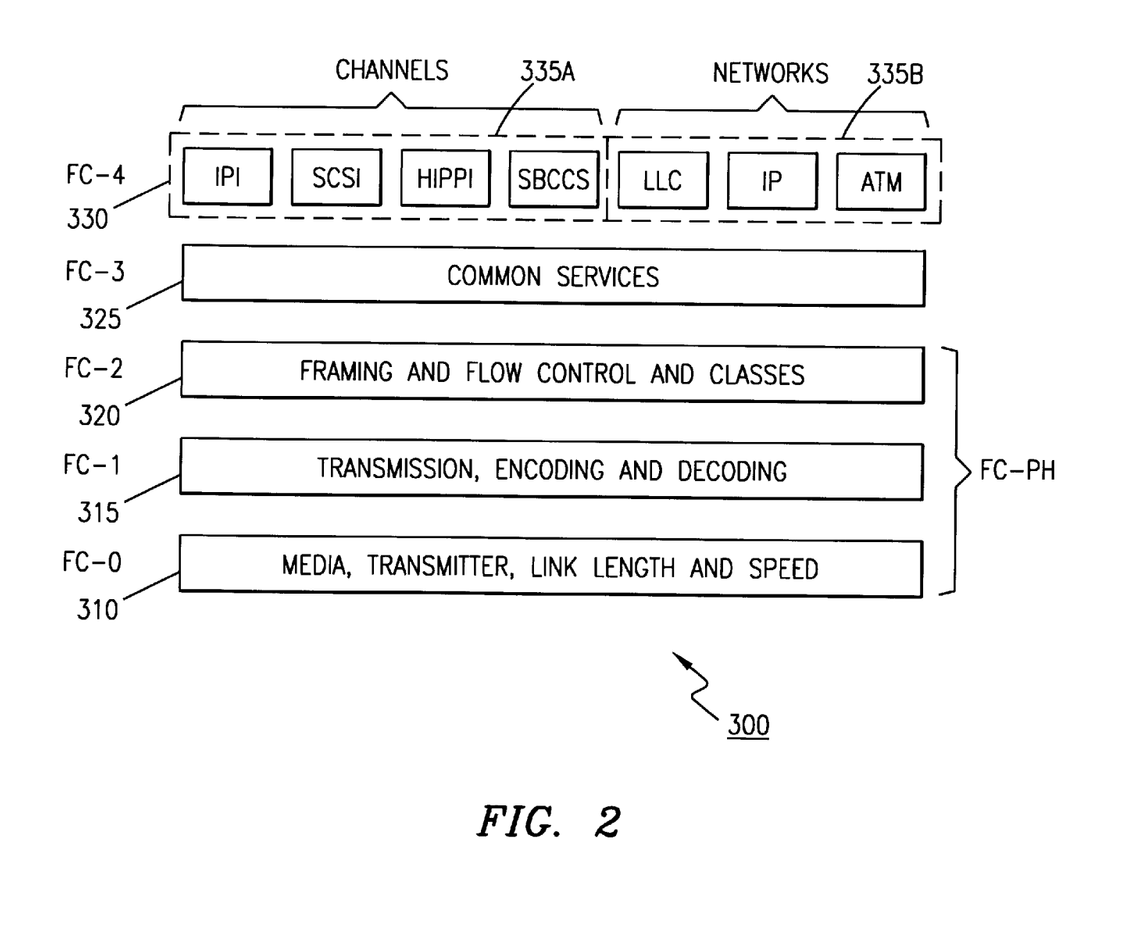
FIG. 2 depicts a diagrammatic representation of the Fibre Channel (FC) Protocol stack.

Referring now to FIG. 2, a diagrammatic representation of the FCP stack architecture is shown generally at 300. As can be readily appreciated, the FCP architecture is structured as a hierarchical set of protocol layers, much like the Open Systems Interface ("OSI") stack. The three bottom layers of the FC stack (layer 310, labeled as FC-0, through layer 320, labeled as FC-2) form what is known as the Fibre Channel Physical Standard ("FC-PH"). This Standard defines all the physical transmission characteristics of a Fibre Channel environment including, for example, the FC environment 220 (shown in FIG. 1). The remaining layers (layer 325, labeled as FC-3 and layer 330, labeled as FC-4) handle interfaces with other network protocols and applications. Unlike the existing Local Area Network ("LAN") technologies such as Ethernet and Token Ring, FC keeps the various functional layers of the stack 300 physically separate. As can be appreciated, this physical separation enables implementation of some stack functions in hardware and others in software or firmware.

The layer 310, FC-0, is the lowest functional layer of the FC architecture and describes the physical characteristics of the link connections among the plurality of FC devices disposed in the FC environment 220 (shown in FIG. 1). FC-0 supports a basic rate of 133 Mbaud, the most commonly used speed of 266 Mbaud, as well as 531 Mbaud and 1.062 Gbaud. However, because of the overhead involved in establishing and maintaining link connections, the actual data throughput is somewhat lower: 100 Mbit/s for 133 Mbaud, 200 Mbit/s for 531 Mbaud, 400 Mbit/s for 531 Mbaud, and 800 Mbit/s for 1.062 Gbaud. Further, FC-0 supports a wide range of physical cabling, including single-mode or multimode fiber-optic cable, coaxial cable, and shielded twisted pair ("STP") media. Each of these cabling elements supports a range of data rates and imposes specific distance limitations, but FC can mix all of them within the same FC environment such as the FC environment 220 shown in FIG. 2. For instance, single-mode optical fiber could be used for distances up to 10 km; multimode fiber, at 200 Mbit/s, could be used for distances up to 2 km; and STP, which supports 100 Mbit/s, may be used for up to 50 meters.

The layer 315, FC-1, defines the transmission protocol, including the serial encoding and decoding rules, special characteristics, and error control. FC-1 uses an 8B/10B block code, where every 8 data bits are transmitted as a 10-bit group with two extra bits for error detection and correction, known as disparity control. The 8B/10B scheme supplies sufficient error detection and correction to permit use of low-cost transceivers, as well as timing recovery methods to reduce the risk of radio-frequency interference and ensure balanced, synchronized transmissions.

The third layer of the FC-PH, layer 320, FC-2 describes how data is transferred between the FC devices, each FC device being disposed at a "Node," and includes the definition of the frame format, frame sequences, communications protocols, and service classes. The basic unit of data transmission in Fibre Channel is a variable-sized frame. Frames can be up to 2,148 bytes in length, comprising a payload of up to 2,048 bytes; 36 bytes of overhead that provides framing, source and destination port addressing, service type, and error detection information; and up to 64 bytes of additional optional overhead for other miscellaneous information about the user data, that is, the payload. A single higher layer (that is, the upper layers in the stack 300) protocol message may be larger than a frame's payload capacity, in which case, the message will be fragmented into a series of related frames called a sequence.

Continuing to refer to FIG. 2, FC-2 layer can be appreciated as the main "workhorse" of the FCP stack 300. It frames and sequences data from the upper layers (layers 325 and 330) for transmission via the FC-0 layer; it accepts transmissions from the FC-0 layer and reframes and resequences them, if necessary, for use by the upper layers 325 and 330. In addition to defining full duplex transmission path between two nodes, the FC-2 layer also provides essential traffic management functions, including flow control, link management, buffer memory management, and error detection and correction. An important feature of the FCP stack 300 is that the FC-2 layer defines four classes of service to meet a variety of communication needs. Class 1 Service defines hard-wired or circuit-switched connections that are dedicated, uninterruptible communication links. This service provides exclusive use of the connection for its duration (sometimes called a "selfish connection"). Class 1

Service is designed for time-critical, "non-bursty" dedicated links, such as those between two supercomputers. Class 2 Service is a connectionless, frame-switched transmission that guarantees delivery and confirms receipt of traffic. Like conventional packet-switching technologies such as frame relay, Class 2 switching is performed on the FC data frame rather than on a connection. No dedicated connection is established between the nodes; each frame is sent to its destination over any available route. When congestion occurs in Class 2 traffic, the frame is retransmitted until it successfully reaches its destination. Class 3 Service defines one-to-many connectionless frame-switched service that is similar to Class 2 Service, except that it has no delivery guarantee or confirmation mechanism. It can be appreciated that Class 3 transmissions are faster than Class 2 transmissions because they do not wait for confirmation. But if a transmission does not arrive at its destination, Class 3 Service does not retransmit. This service is most often used for real-time broadcasts that cannot wait for acknowledgment but are not sufficiently time-critical to warrant Class 1 Service. It is also used for applications that can tolerate lost frames. Class 4 Service is a connection-based service that offers guaranteed fractional bandwidth and guaranteed latency levels.

The FC-3 layer, layer 325, provides a common set of communication services of higher layer protocols above the FC-PH level. These additional services may include, for example, mechanisms for multicast and broadcast data delivery, "hunt" groups wherein more than one target node can respond to a given initiator node, and multiplexing multiple higher layer protocols and the FC-PH.

The top layer, layer 330, of the FCP stack 300 is the FC-4 layer. It defines the higher layer applications that can operate over an FC infrastructure such as, for instance, the FC environment 220 shown in FIG. 2. The FC-4 layer provides a way to utilize existing channel and network protocols over Fibre Channel without modifying those protocols. Accordingly, the FC-4 layer acts like a protocol convergence layer so that the FC node appears to provide the exact lower-layer transport services that the higher-layer channel or network protocol requires. This convergence function may require that the FC-4 layer provide additional services such as buffering, synchronization, or prioritization of data. It can be appreciated that the FC-4 functionality is encompassed in the link path 225 disposed between the FC environment 220 and the OS-compatible interface 215 of the exemplary computer system 200, shown in FIG. 1.

Still continuing to refer to FIG. 2, various FC-4 level mappings have been specified for a number of higher layer channel and network communication protocols, including: Intelligent Peripheral Interface ("IPI") ; SCSI; High-Performance Parallel Interface ("HIPPI"); Single Byte Command Code Set ("SBCCS"); Logical Link Control ("LLC"); IP; and Asynchronous Transfer Mode ("ATM") Adaptation Layer ("AAL").

Devices that are operable with the Fibre Channel Protocol, irrespective of whether they are initiators or targets, typically include a controller (hereinafter an "FC controller") that embodies the functionality of some of the middle-layers of the FCP stack 300. For example, current FC controllers typically embody the functionalities of the layers 315 and 320 (FC-1 and FC-2). On the other hand, a host computer system, such as the exemplary computer system 200 shown in FIG. 1, would be responsible for the upper-layers (FC-3 and FC-4). A Physical Link Module ("PLM") such as, for example, a Gigabit Link Module ("GLM") would implement the bottom-most layer 310 (FC-0).

Figure 3A:
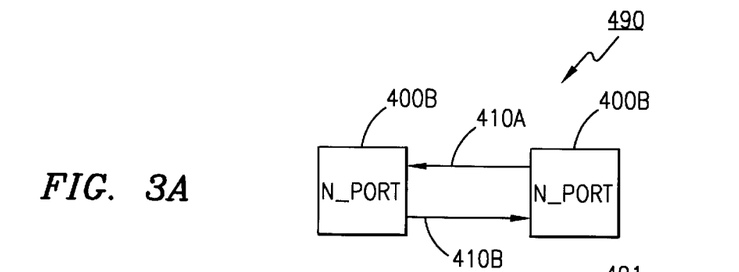
FIGS. 3A–3C depict block diagrams of the three topological configurations available for Fibre Channel Nodes.
Figure 3B:
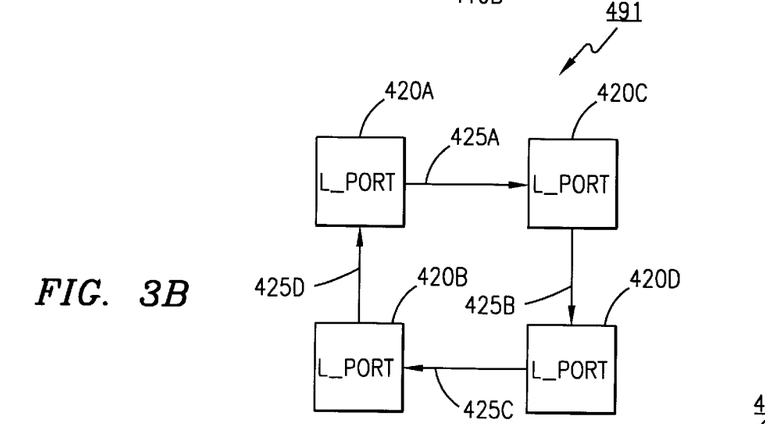
Figure 3C:
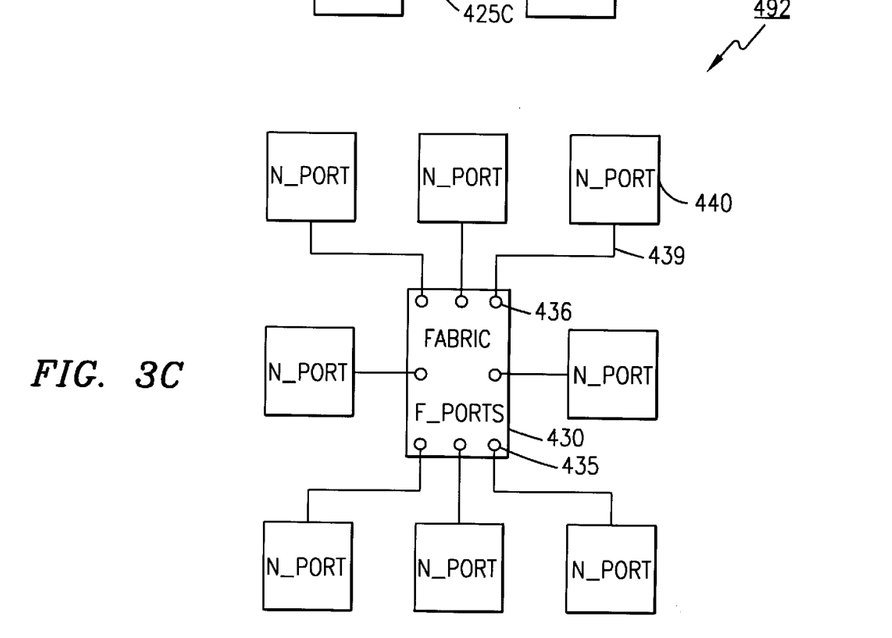

Referring now to FIGS. 3A–3C, three exemplary topological configurations are shown, generally at 490, 491, and 492, respectively, into which the FC Nodes may be arranged. A Node is an entity, system, or device that has the capability to process the ULPs, the FC-3, and some of the FC-2 functions. A Node may contain one or more ports, commonly known as Node Ports or N_Ports. An N_Port is a hardware entity within a Node that supports the FC-PH. It may act as an originator (that is, an initiator), a responder (that is, a target), or both. Hereinafter, the terms Node, device and Port will be used somewhat interchangeably for the purpose of the present invention.

Reference numeral 490 refers to a point-to-point topology which utilizes bidirectional communication links 410A, 410B to provide a full duplex transmission path between any two FC Nodes, denoted here as N_Ports 400A and 400B. This connection topology provides the maximum possible bandwidth and lowest latency since there are no intermediate devices/Nodes.

Reference numeral 492 refers to a switched fabric topology where each FC device or Node (N_Port) is connected to an F_Port that is part of a fabric, for example fabric 430, and receives a non-blocking data path to any other connection on the fabric. An F_port is the access point of the fabric for physically connecting to another Node. The fabric 430 may be a switch or series of switches and is responsible for routing between Nodes, error detection and correction, and flow control. The operation of the fabric 430 is independent of the higher layer communication protocols, largely distance-insensitive, and may be based on any technology. Communication paths, for example, path 439, provide a bidirectional connection between a Node, N_Port 440 and a fabric port (F_Port) 436. The switched fabric topology 492 provides the maximum connection capability and total aggregate throughput of all the three FC topologies. It may be appreciated that the switched fabric topology 492 provides the capability to interconnect large number of systems; to sustain high bandwidth requirements; to match data rates between connections of different speeds; and to match different cabling elements.

Reference numeral 491 denotes a loop topology known in the art as an Arbitrated Loop ("AL") pursuant to a connection standard referred to as the FC-AL standard. The loop topology 491 interconnects a plurality of FC devices or Nodes (denoted as loop ports or L_Ports) such as, for example, L_Ports 420A through 420D, via unidirectional links, for example, links 425A through 425D. Thus, this connection arrangement enables each device to use the loop topology 491 as a point-to-point connection between a sender and a receiver, irrespective of any intermediate devices disposed therebetween which merely act as "repeaters."

The arbitrated loop 491 provides a low-cost means of attaching multiple devices without the need for hubs or switches. Although only four L_Ports are shown in FIG. 3B, the loop provides shared bandwidth for up to 127 L_Ports. Each L_Port requests use of the loop when it needs to communicate with another port; if the loop is free, the requesting port sets up a bidirectional connection with the destination port. The loop protocol permits an L_Port to continuously arbitrate to access the transmission medium to transmit to another L_Port; a fairness algorithm ensures that no L_Port gets blocked from accessing the loop. Once a connection is established, it can then deliver any class of service appropriate to the traffic between the two L_Ports.

As is known in the art, only one pair of L_Ports may communicate at one time. When these L_Ports relinquish control of the loop, another point-to-point connection between two L_Ports may be established. Further, the entire loop may be attached, in turn, to a FC switch fabric port via what is known as an FL_Port, or directly to a single host system via an NL_Port.

Because the presently preferred exemplary embodiment of the present invention encompasses an FC-AL topology, such as the loop topology 491, the general operation of this nodal configuration will be described in greater detail hereinbelow.

It is known that the FC-AL standard allows each FC device to negotiate for an Arbitrated Loop Physical Address (AL_PA) in a Loop Initialization process. While participating on an Arbitrated Loop, the FC devices must log in to each other before commencing a loop transaction. The login procedure is the initial procedure all communicating Nodes go through to establish service parameters and a common operating environment. One of the examples of service parameters is a "credit" limit, which represents the maximum number of outstanding frames that can be transmitted by a Port without causing a buffer overrun at the receiving Port. As can be seen, credit is a flow control mechanism that throttles link traffic by limiting the number of frames each originator Port can send. In conventional FC controllers, two types of credit are typically used: buffer-to-buffer credit ("BB_Credit") and end-to-end credit ("EE_Credit").

If a device not logged in to another device, it will discard any frames it receives from that device until it is logged in. Since an initiator or driver must be able to manage the target device with which it is communicating, the initiator keeps track of an FC-specific identity triplet for that target device. This FC-specific ID triplet comprises a target's Node_Name, it's Port_Name, and it's AL_PA. While the AL_PA is dynamically assigned upon a loop reset, the Node_Name and Port_Name are formed from the device's unique World_Wide_Name.

When the devices come up onto an Arbitrated Loop upon a reset, they configure their AL_PAs in one of three ways in the Loop Initialization step. In a Soft Address scheme, the device does not care what AL_PA it is assigned. Rather, it simply accepts the first free AL_PA available. In a Preferred Address scheme, the FC device would like to be assigned a particular AL_PA. However, if a desired AL_PA is unavailable for some reason, it will accept whichever AL_PA that is free and available. For example, after a device is assigned a specific AL_PA for the first time upon "global" system initialization following the loading of the OS, that device will continue to request for that AL_PA upon subsequent loop resets. However, once this device goes off-line from the Arbitrated Loop, it will lose its ability to "prefer" that AL_PA and must resort to accepting the first free AL_PA that is available.

Thirdly, in a Hard Address scheme, the FC device can only operate at a particular AL_PA. According to the Loop Initialization Protocol ("LIP") in the FC-AL Standard, which handles the configuration of the AL_PAs, this method of address configuration takes precedence over the first two methods, namely, the Soft Address and Preferred Address schemes.

The initiator FC devices can initiate a Link Service Command/Frame after all AL_PA assignment issues have been resolved. Link Service Frames include both "request" and "response" frames. Request frames are those Link Service Frames which require a receiving device to send back a response frame and include, among others, Login Link Service Frames ("PLOGI"), Logout Frames ("PLOGO"), Discover N_Port Service Parameters Frames ("PDISC"), Discover Address Frames ("ADISC"), Process Login Frames ("PRLI"), Process Logout Frames ("PRLO") and Reinstate Recovery Qualifier Frames ("RRQ").

In a single initiator environment, the initiator device sends out Link Service Frames as needed and expects in response thereto an Acknowledgement Frame (LS_ACC) or a Reject Frame (LS_RJT). Further, the initiator device keeps track of the type of Link Service Frames that are sent out by storing the type information (hereinafter "type information element") for each Link Service Frame in a storage array called outstanding_link_services array. Typically, this outstanding_link_services array comprises a plurality of storage locations each of which corresponds to a recipient device's AL_PA. Moreover, in typical embodiments, all Link Service Frame types are stored for each recipient as they are sent out.

The initial Port Discovery Process by an initiator device is a two-step process in the FC-AL environment, irrespective of whether it comprises one or more initiators. First, if the initiator is already logged into a recipient device then a PDISC frame is transmitted. Otherwise, a PLOGI frame is transmitted. Second, if an LS_ACC frame is received back in response to a PLOGI frame, the initiator then sends a PRLI frame to that responder. On the other hand, if the LS_ACC frame is received back in response to a PDISC frame, no other frames need to be sent to that responder.

It can be appreciated that in a multi-initiator environment a PLOGI frame will be sent to an initiator when it is expecting an LS_ACC or LS_RJT frame in l response to its own PLOGI request frame. If two initiators need to communicate with each other, they both will have to continue with the Login protocol. If, for some reason, one initiator does not support communicating with other initiators, it can simply ignore the PLOGI frame it receives from the sender, or, send an LS_RJT frame back to the sender. However, as can be appreciated, this option will severely curtail the communication system's performance and impact negatively the throughput associated therewith.

Figure 4:
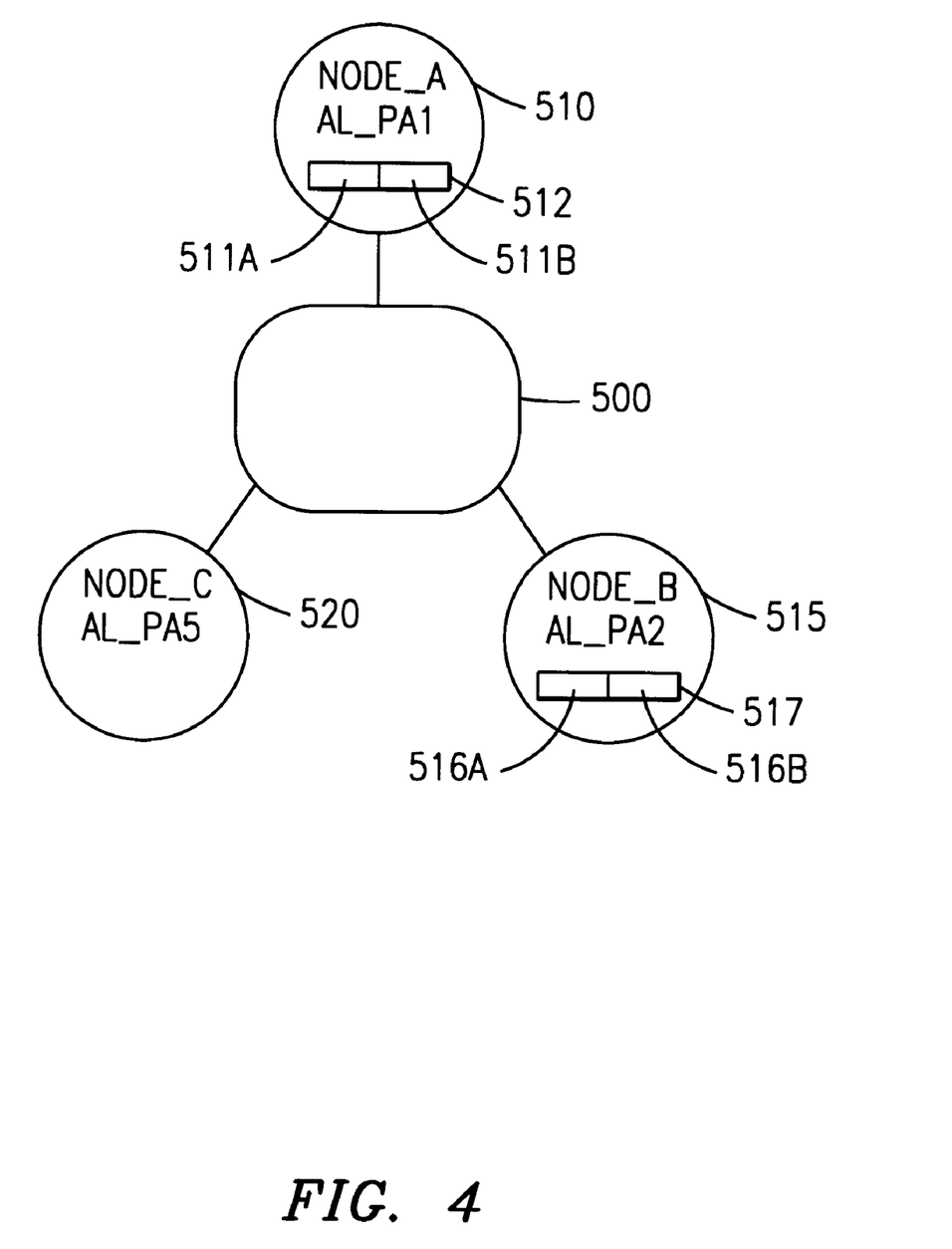
FIG. 4 illustrates an exemplary embodiment of an Arbitrated Loop with multiple initiators in accordance with the teachings of the present invention.

Referring now to FIG. 4, therein is depicted an exemplary embodiment of an Arbitrated Loop 500 comprising two initiator devices, Initiator 510 and Initiator 515, and a Target 520, in accordance with the teachings of the present invention. Initiator 510 possesses AL_PA1 with its Node_Name being Node_A. Initiator 515 is located at AL_PA2 with its Node_Name being Node_B. Continuing further, Target 520 is located at AL_PA5 with Node_C. Although no Port_Names are specifically designated in this FIG., it should be understood that they are present for the ID triplets associated with each of the devices.

Initiator 510 comprises a storage array, called outstanding_link_services ("OLS") array 512 which, in turn, includes locations 511A and 511B for storing type information elements corresponding to any Links Service Frames that are sent to AL_PA2 (for Initiator 515) and AL_PA5 (for Target 520), respectively. Similarly, Initiator 515 also comprises an OLS array 517 with locations 516A (for AL_PA1, that is, Initiator 510) and 51613 (for AL_PA5, that is, Target 520).

Upon successfully completing a Loop Initialization process, Initiator 510 will send a PLOGI frame each to Initiator 515 and Target 520. Initiator 510 stores the type information elements corresponding to these PLOGI frames at locations 511A and 511B in its OLS array 512. In an analogous fashion, Initiator 515 will send a PLOGI frame each to Initiator 510 and Target 520, and store the corresponding type information elements at locations 516A and 516B in its OLS array 517.

When Initiator 510 receives the PLOGI frame from Initiator 515, it will send a response frame such as, for example, the LS_ACC frame, to Initiator 515. In accordance with the teachings of the present invention, Initiator 510 will simply send the response frame without storing the corresponding type information element at location 511A. Thus, location 511A retains the initial type information element corresponding to the PLOGI frame sent by Initiator 510 to Initiator 515. Accordingly, when a response frame (an LS_ACC, for example) comes back to Initiator 510 from Initiator 515, Initiator 510 can quickly determine that the received response frame is in fact in response to its PLOGI frame sent to Initiator 515.

If, for example, the PLOGI frame from Initiator 515 came to Initiator 510 before Initiator 515 responded to the PLOGI frame from Initiator 510, and Initiator 510 responded with its LS_ACC and stored its type information element at location 511A, then in receiving the LS_ACC frame from Initiator 515, Initiator 510 would not be able to proceed with the Login process quickly, because after receiving the LS_ACC frame from Initiator 515, it would have had to parse the payload of the received LS_ACC in order not to be "thrown off the track." Further, in receiving an LS_ACC frame back when OLS array 512 is stored with a type information element for an LS_ACC frame, Initiator 510 may enter an indeterminate state thereby stalling the Login process. However, by providing multiple initiators in accordance with the teachings of the present invention, such loop interruptions are significantly minimized.

Figure 5:
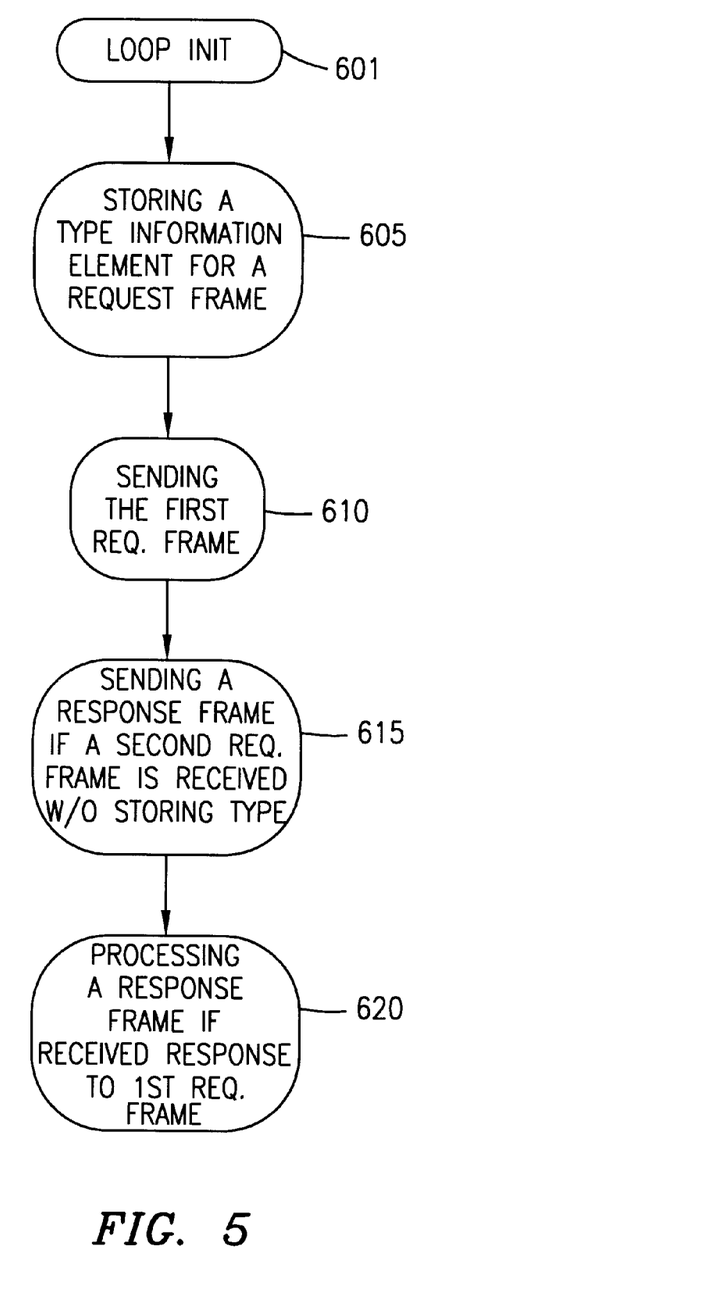
FIG. 5 depicts an exemplary flow diagram for a method of controlling a multi-initiator Arbitrated Loop in accordance with the teachings of the present invention.

FIG. 5 depicts an exemplary flow diagram for a presently preferred method of controlling multiple initiators in a Fibre Channel environment such as, for example, the Arbitrated Loop 500 described hereinabove.

Upon completing a Loop Initialization in step 601, an initiator first stores a type information element for an appropriate request frame that is to be transmitted to all valid AL_PAs discovered. This process is indicated in step 605. Subsequently, the appropriate request frame is transmitted, as shown in step 610. If a request frame is received from another initiator device, an appropriate response frame is sent back without storing its type information element (step 615).

Continuing to refer to FIG. 5, if an appropriate response frame is received from an initiator, then the receiving initiator appropriately processes that response frame (step 620) without manipulating the contents thereof. Although such processing may involve reading, interrogating, or the like, of the received information, it would preferably not entail parsing of the payload associated with the received response frame.

It should now be appreciated by those skilled in the art that the present invention successfully overcomes the problems of the prior art by providing an innovative mechanism for controlling and managing multiple initiators in FC environments. Although only certain embodiments of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. In a Fibre Channel (FC) communication environment, said environment includes a plurality of FC devices, at least two of said FC devices are initiators, a method for managing and controlling the FC communication environment, comprising the steps of:

transmitting a request frame from each of said at least two initiators to each of said plurality of FC devices;

storing a first type information element associated with said request frame in conjunction with said step of transmitting a request frame; and sending a response frame from each of said at least two initiators without storing a second type information element associated with said response frame, in response to a received request frame.

2. The method as recited in claim 1, further comprising the step of completing a Loop Initialization process associated with an Arbitrated Loop.

3. The method as recited in claim 1, further comprising the step of processing by each of said at least two initiators of said response frame received in response to said request frame without manipulating the contents of a payload associated with said response frame.

4. A system for managing and controlling a Fibre Channel (FC) communication environment, the system comprising:

a first initiator for initiating transmission of a request frame from each of said at least two initiators to each of said plurality of FC devices after storing a first type information element associated with said request frame; and a second initiator for initiating transmission of a response frame from each of said at least two initiators without storing a second type information element associated with said response frame.

5. The system as recited in claim 4, wherein the first initiator is for initializing an Arbitrated Loop.

6. The system as recited in claim 4, wherein the initiator is for processing a response frame received in response to said request frame without manipulating the contents of a payload associated with said received response frame.

7. A method for operating an Arbitrated Loop topology, said Arbitrated Loop topology includes at least two initiators, comprising the steps of:

completing a Loop Initialization step;

storing a type information element associated with a request frame to be sent by each of said at least two initiators;

sending said request frame from each of said at least two initiators; and sending a response frame from each of said at least two initiators, said response frame being transmitted in response to receiving said request frame.

8. The method as recited in claim 7, further comprising the step of processing by each of said at least two initiators of said response frame received in response to said request frame without manipulating the contents of a payload associated with said response frame.

* * * * *

UNITED STATES PATENT AND TRADEMARK OFFICE
CERTIFICATE OF CORRECTION

PATENT NO.   : 6,014,383
DATED        : January 11, 2000
INVENTOR(S)  : James F. McCarty It is certified that error appears in the above-identified patent and that said Letters Patent is hereby corrected as shown below:

Column 10,
Line 28, after "environment," insert -- which environment includes a plurality of FC devices, at least two of which FC devices are initiators --.
Line 40, before "initiators" insert -- second --.
Line 41, after "processing" delete "a" and insert -- the -- therefor.
Line 43, delete "received".

Signed and Sealed this

Thirty-first Day of May, 2005

JON W. DUDAS
*Director of the United States Patent and Trademark Office*